United States Patent
Blewett et al.

(10) Patent No.: US 11,383,854 B2
(45) Date of Patent: Jul. 12, 2022

(54) OIL RESERVOIR VENT VALVE

(71) Applicant: Hamilton Sundstrand Corporation, Charlotte, NC (US)

(72) Inventors: Michael R. Blewett, Stillman Valley, IL (US); Matthew Allen Slayter, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 297 days.

(21) Appl. No.: 16/730,696

(22) Filed: Dec. 30, 2019

(65) Prior Publication Data
US 2021/0197980 A1 Jul. 1, 2021

(51) Int. Cl.
| | |
|---|---|
| *B64D 37/24* | (2006.01) |
| *F01M 1/02* | (2006.01) |
| *F01M 1/10* | (2006.01) |
| *B01D 19/00* | (2006.01) |
| *F16N 17/06* | (2006.01) |

(52) U.S. Cl.
CPC ......... *B64D 37/24* (2013.01); *B01D 19/0052* (2013.01); *F01M 1/02* (2013.01); *F01M 1/10* (2013.01); *F16N 17/06* (2013.01); *Y10T 137/3003* (2015.04)

(58) Field of Classification Search
CPC ...... B64D 37/24; B01D 19/0052; F01M 1/02; F01M 1/10; F01M 13/00; F16N 17/06; F16N 2210/08; F16N 7/40; F16N 39/002; Y10T 137/3003; F05D 2260/602; F05D 2260/605; F05D 2260/606; F05D 2260/609; F05D 2260/98; F01D 25/20

USPC .......................................................... 137/14
See application file for complete search history.

(56) References Cited

U.S. PATENT DOCUMENTS

| | | | |
|---|---|---|---|
| 3,439,497 A | 4/1969 | Cross | |
| 4,511,016 A * | 4/1985 | Doell | F01D 25/20 184/6.28 |
| 4,531,358 A | 7/1985 | Smith | |

(Continued)

FOREIGN PATENT DOCUMENTS

| | | |
|---|---|---|
| EP | 0143182 A1 | 6/1985 |
| EP | 1333156 A1 | 8/2003 |

(Continued)

OTHER PUBLICATIONS

Extended European Search Report for EP Application No. 20201047.6, dated Apr. 29, 2021, 12 pages.

*Primary Examiner* — Yi-Kai Wang
(74) *Attorney, Agent, or Firm* — Kinney & Lange, P.A.

(57) ABSTRACT

An oil reservoir assembly includes a tank, a return passage, a pressurization valve, a first passage, and a vent valve. The tank includes a canister, a fill port, an first oil outlet, an second air outlet, and an inlet. The inlet is disposed in the canister and is connected to a restrictor. The return passage is connected to the inlet of the tank and to a scavenge pump. The pressurization valve is fluidly connected to the second air outlet of the tank. The first passage is connected to the pressurization valve and to an accessory gearbox of the engine. The vent valve is disposed in the return passage and includes a body, a channel extending through the body, an inlet orifice, and an outlet orifice. The inlet orifice is disposed in an end of the body. The outlet orifice is fluidly connected to the inlet orifice via the channel.

12 Claims, 4 Drawing Sheets

(56) References Cited

U.S. PATENT DOCUMENTS

| | | |
|---|---|---|
| 6,463,819 B1 | 10/2002 | Rago |
| 9,194,254 B2 | 11/2015 | Short et al. |
| 9,284,866 B2 | 3/2016 | Short et al. |
| 2005/0276685 A1 | 12/2005 | Wiggins et al. |
| 2011/0266370 A1* | 11/2011 | Roessle ................. F01N 3/2066 239/459 |
| 2012/0204723 A1* | 8/2012 | Angst .................... B01D 45/14 96/61 |
| 2014/0144120 A1 | 5/2014 | Slayter et al. |
| 2020/0072166 A1* | 3/2020 | Honda ............... F02M 25/0836 |
| 2020/0392866 A1* | 12/2020 | Younes .................. F01D 25/20 |
| 2021/0055185 A1* | 2/2021 | Jean ......................... G01N 1/14 |
| 2021/0170318 A1* | 6/2021 | Lu .......................... B01D 45/02 |

FOREIGN PATENT DOCUMENTS

| | | |
|---|---|---|
| EP | 2166195 A2 | 3/2010 |
| GB | 2453837 A | 4/2009 |
| JP | 2012177341 A | 9/2012 |
| RU | 2273745 C1 | 4/2006 |
| RU | 2618996 C1 | 5/2017 |

* cited by examiner

OIL RESERVOIR VENT VALVE

BACKGROUND

The present disclosure relates to a reservoir assembly in an aircraft. More particularly, the present disclosure relates to de-pressurizing a reservoir tank of an aircraft.

Upon shut-down of aircraft engines, existing engine oil tanks utilize a bleed orifice mounted on a tank to release pressure from the oil tank in order to service the tank. However, such passive bleed orifices can cause the pressure in the tank to drop below acceptable levels at high altitudes, and can slow de-pressurization of the tank at engine shut-down.

SUMMARY

An oil reservoir assembly includes a tank, a return passage, a pressurization valve, a first passage, and a vent valve. The tank includes a canister, a fill port, an first oil outlet, an second air outlet, and an inlet. The inlet is disposed in the canister and is connected to a restrictor. The return passage is connected to the inlet of the tank and to a scavenge pump. The pressurization valve is fluidly connected to the second air outlet of the tank. The first passage is connected to the pressurization valve and to an accessory gearbox of the engine. The vent valve is disposed in the return passage and includes a body, a channel extending through the body, an inlet orifice, and an outlet orifice. The inlet orifice is disposed in an end of the body. The outlet orifice is fluidly connected to the inlet orifice via the channel.

A method of reducing the pressure in an oil reservoir tank of an aircraft includes turning off an engine of the aircraft. A valve element is seated inside of a pressurization valve that is disposed fluidly between a second air outlet of the oil reservoir tank and a first passage connected to an accessory gearbox of the engine. Air and oil are drawn out of the return passage into the oil reservoir tank. A portion of the air is drawn out of the oil reservoir tank through an inlet of the oil reservoir tank and into the return passage. Air is vented from the return passage into a bleed orifice in a vent valve. The bleed orifice is disposed in a shaft of the vent valve that extends into the return passage. The bleed orifice is connected to a channel extending through the shaft of the vent valve. Air is passed through the channel of the vent valve and into a bleed flow passage connected to the accessory gearbox of the engine.

The present summary is provided only by way of example, and not limitation. Other aspects of the present disclosure will be appreciated in view of the entirety of the present disclosure, including the entire text, claims, and accompanying figures.

Figure 1:
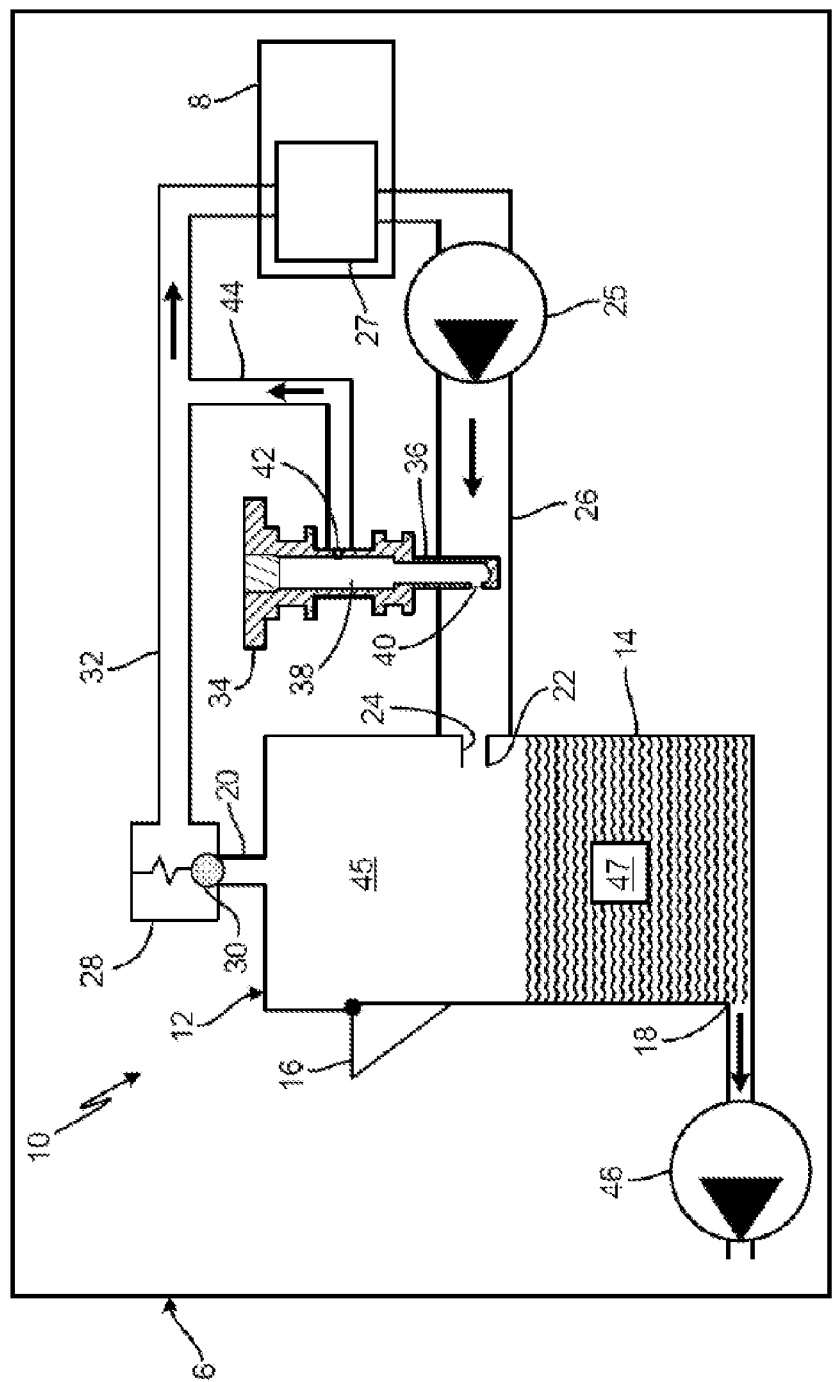
FIG. 1 is a schematic view of a reservoir assembly and shows a vent valve and pressurization valve in a closed position.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The proposed tank pressurization system utilizes a vent valve located in a scavenge return passage that allows airflow from the tank to escape through an orifice in the vent valve during a shut-down mode, thereby depressurizing the tank and keeping the pressure sufficiently low to allow access and servicing of the oil tank.

FIG. 1 is a schematic view of aircraft 6 with engine 8 and shows reservoir assembly 10 with tank 12 (with canister 14, fill port 16, first oil outlet 18, second air outlet 20, inlet 22, and restrictor 24), scavenge pump 25, return passage 26, accessory gearbox 27, pressurization valve 28 (with valve element 30), first passage 32, vent valve 34 (with body 36, channel 38, inlet orifice 40, outlet orifice 42), bleed flow passage 44, air 45, pump 46, and oil 47. In this embodiment, pressurization valve 28 is shown in a closed position with valve element 30 in a seated position. Also in this example, fill port 16 is shown in a closed position.

In this example, reservoir assembly 10 is for use with aircraft 6. Tank 12 is a receptacle or storage container for fluid(s). In this example, tank 12 is an oil reservoir tank. Canister 14 is a container such as a hollow tank. Fill port 16, first oil outlet 18, second air outlet 20, and inlet 22 are fluidic ports in canister 14. Restrictor 24 represents a component which reduces the pressure as the fluid enters tank 12. In one example, restrictor 24 can be a centrifugal separator. In another example, restrictor 24 can be a simple orifice. Scavenge pump 25 is a fluidic pump. In this example, scavenge pump 25 is connected to accessory gearbox 27 (or another component from which the air and oil is scavenged). Return passage 26, first passage 32, and bleed flow passage 44 are lines for transportation of a fluid. Pressurization valve 28 is a fluidic valve. In this example, pressurization valve 28 is a spring loaded poppet valve. Valve element 30 is a movable actuatable flow obstruction.

Vent valve 34 is a fitting or connector that includes body 36, channel 38, inlet orifice 40, and outlet orifice 42. Body 36 is an elongate piece of solid material. In this example, body 36 is a shaft or cylindrical protrusion. Channel 38 is a passage. Inlet orifice 40 and outlet orifice 42 are fluidic ports. Pump 46 is a pump of aircraft 6. In this example, pump 46 can be a lubrication pump. Air 45 is air collected from scavenge pump 25. Oil 47 is oil or lubricant also collected from scavenge pump 25. In other non-limiting embodiments, air 45 and oil 47 can be collected from other portions of aircraft 6 besides, and/or in addition to, scavenge pump 25.

Tank 12 is fluidly connected to scavenge pump 25 via return passage 26. Tank 12 is fluidly connected to accessory gearbox 27 via first passage 32. Canister 14 is connected to return passage 26 via inlet 22. Canister 14 is connected to pressurization valve 28 via second air outlet 20. Canister 14 is connected to pump 46 via first oil outlet 18. Fill port 16 is disposed in a sidewall of canister 14. First oil outlet 18 is disposed on a bottom end of canister 14 (with the bottom and a top of canister 14 being a lower end and an upper end, respectively as shown in FIG. 1). Second air outlet 20 is mounted to a top end of canister 14. Inlet 22 is disposed in another sidewall of canister 14. Restrictor 24 is mounted to a portion of inlet 22. In this example, scavenge pump 25 is connected to accessory gearbox 27 (or other component from which the air and oil is scavenged). Return passage 26 is connected to and extends between inlet 22 and scavenge pump 25. Pressurization valve 28 is connected to second air outlet 20 and to first passage 32. Valve element 30 is disposed in pressurization valve 28. In this embodiment, valve element 30 is shown as occupying a seated position within pressurization valve 28. First passage 32 is connected to and extends between pressurization valve 28 and accessory gearbox 27.

Body 36 of vent valve 34 is disposed partially in return passage 26. Channel 38 extends between and is fluidly connected to inlet orifice 40 and to outlet orifice 42. Channel 38 is disposed through a portion of body 36. Inlet orifice 40 is disposed in body 36 and is fluidly connected to channel 38. In this example, inlet orifice 40 is positioned on a side of body 36 that faces towards tank 12. Put another way, inlet orifice 40 is located on a downstream side of body 36 relative to a direction of flow of air and oil during operation of reservoir assembly 10 (the direction of flow during operation of reservoir assembly 10 is right-to-left as shown in FIG. 1). Outlet orifice 42 is disposed in body 36 and is fluidly connected to inlet orifice 40 via channel 38. Bleed flow passage 44 runs between vent valve 34 and a point along first passage 32. Bleed flow passage 44 fluidly connects outlet orifice 42 to accessory gearbox 27. Pump 46 is fluidly connected to first oil outlet 18 of canister 14. Air 45 is disposed in an upper portion of canister 14 and oil 47 is disposed in a lower portion of canister 14.

During operation of aircraft 6, tank 12 collects air and oil scavenged by scavenge pump 25. As air and oil are collected into tank 12, canister 14 contains air 45 and oil 47 within tank 12. Fill port 16 is used to access tank 12 during periods of servicing. Fill port 16 is accessed to add oil to tank 12 after the engine has been shut-down. First oil outlet 18 is an orifice that transfers oil out of canister 14 to pump 46. Second air outlet 20 transfers air from canister 14 to pressurization valve 28. Inlet 22 transfers air and oil from return passage 26 into canister 14.

In this example, restrictor 24 is a centrifugal device that separates air 45 from the oil 47 as an air-oil mixture is delivered to canister 14 by return passage 26. Additionally, during operation of reservoir assembly 10, a pressure differential is created across restrictor 24 such that a pressure in canister 14 is less than a pressure in return passage 26. This pressure differential across restrictor 24 prevents air 45 and oil 47 from being back fed into return passage 26 during operation of reservoir assembly 10. The higher pressure in return passage 26 is created by scavenge pump 25 of the engine that pumps air 45 and oil 47 out of accessory gearbox 27 (or other component from which the air and oil is scavenged).

In this example, scavenge pump 25 scavenges air and oil from accessory gearbox 27. Return passage 26 transports air 45 and oil 47 from scavenge pump 25 to inlet 22 of tank 12. Here, the height location of return passage 26 being higher relative to a static oil level in tank 12 after shutdown enables air 45 to flow back through restrictor 24 and into return passage 26. In order for return passage 26 to completely drain, return passage 26 is located above the static level of oil 47 after shutdown and return passage 26 completely drains into tank 12 so that inlet orifice 40 is exposed to air 45 from tank 12. After shut-down engine 8, the remaining air/oil mixture in return passage 26 drains into tank 12 due to gravity. Once return passage 26 is completely drained, air 45 from tank 12 escapes through inlet orifice 40 of vent valve 34 thereby depressurizing tank 12. During operation, pressurization valve 28 opens to release pressurized air 45 out of tank 12, through second air outlet 20, and into first passage 32.

Valve element 30 is biased in a closed (or seated) position by a spring element until the pressure inside of tank 12 reaches a threshold value. Once the pressure inside of tank 12 reaches the threshold value, valve element 30 is pushed open (or is un-seated) to allow for an open fluid pathway for air from tank 12 to exit through second air outlet 18 and into return passage 26. When seated, valve element 30 prevents flow of air through pressurization valve 28. In this way, valve element 30 maintains an adequate pressure within tank 12 during operation of reservoir assembly 10 and the engine. First passage 32 transports air from pressurization valve 28 back to accessory gearbox 27. First passage 32 also receives air flow from outlet orifice 42 via bleed flow passage 44.

Vent valve 34 functions to release pressure from tank 12 upon shut-down of engine 8. Body 36 provides structural support for vent valve 34 as well as containing channel 38, inlet orifice 40, and outlet orifice 42. Channel 38 transports air 45 from inlet orifice 40 to outlet orifice 42 of vent valve 34. Inlet orifice 40 receives air 45 from return passage 26, a large portion of which comes from tank 12 after shut-down of the engine. In this example, inlet orifice 40 is located on a downstream side of body 36 relative to a direction of flow of air and oil through return passage 26 during engine operation. This location of inlet orifice 40 on the downstream side of body 36 causes wake turbulence and flow separation of the air and oil passing by body 36. The wake turbulence and flow separation that the air and oil experiences pushes the air and oil out and around body 36 creating a pocket of low pressure on the downstream side of body 26.

Due to this wake turbulence and flow separation, the air and oil flow mixture is separated so that any fluid entering inlet orifice 40 during engine operation will be predominantly air. Prevention of oil from entering into inlet orifice 40 during engine operation is important because excessive bypass oil flow to the gearbox case is undesirable. Outlet orifice 42 delivers air 45 into bleed flow passage 44 from vent valve 34. Bleed flow passage 44 transports air 45 from vent valve 34 back to accessory gearbox 27 of the engine. Pump 46 draws oil 47 from tank 12.

In existing reservoir assembly designs, bleed orifices directly in the canister of the tank are incorporated in order to bleed off tank pressure after shut-down so as to allow removal of the tank cap for servicing. A common problem with existing designs however, is that the bleed orifice air flow path is typically large relative to the amount of air (mass flow) returned to the tank under altitude operation. In examples where the airflow path is parallel to the pressurization valve, it is possible that all of the tank return air can exit the bleed orifice before the tank is pressurized (through the pressurization valve) to the desired level. The result is low tank pressure and diminished lube pump performance.

In comparison, reservoir assembly 10 with vent valve 34 provides a depressurization scheme that does not result in a constant airflow from tank 12 during normal operation. For example, because the bleed orifice in the tank has been eliminated from reservoir assembly 10, tank pressurization is positive under all operating conditions. Instead, the pressure differential across restrictor 24 prevents release of pressure from tank 12 during engine operation until the shut-down phase, during which the pressure differential across restrictor 24 is removed and air 45 can back flow through return passage 26 and into inlet orifice 40. Additionally in this non-limiting embodiment, vent valve 34 does not include any moving parts that can have undesirable failure modes resulting in a reduction of valve reliability.

Figure 2:
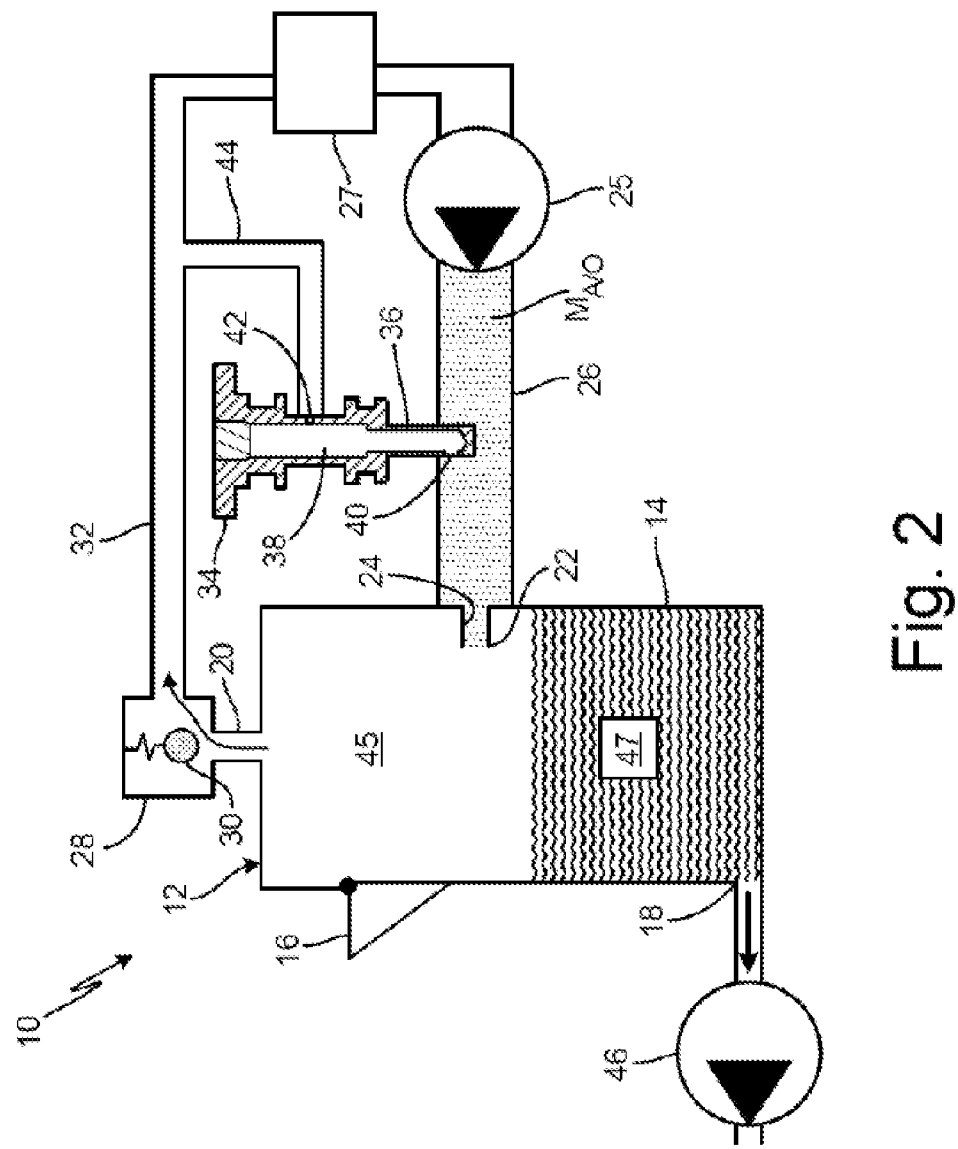
FIG. 2 is a schematic view of the reservoir assembly and shows the vent valve and the pressurization valve in an open position.

FIG. 2 is a schematic view of reservoir assembly 10 and shows tank 12 (with canister 14, fill port 16, first oil outlet 18, second air outlet 20, inlet 22, and restrictor 24), return passage 26, pressurization valve 28 (with valve element 30), first passage 32, vent valve 34 (with body 36, channel 38, inlet orifice 40, outlet orifice 42), bleed flow passage 44, pump 46, air 45, oil 47, and air-oil mix $M_{A/O}$. In this embodiment, pressurization valve 28 is shown in an open position with valve element 30 in an unseated position. Also in this example, fill port 16 is shown in a closed position.

In this example, reservoir assembly 10 is shown with engine 8 in an operational mode. With engine 8 being in operation, a positive pressure builds up in canister 14 as air-oil mix $M_{A/O}$ is forced into tank 12 from scavenge pump 25 via return passage 26. As air-oil mix $M_{A/O}$ passes through restrictor 24, air 45 and oil 47 are separated either through centrifugal action of a dedicated component, or by natural aspiration of the less dense air from the oil as the mixture resides in the tank. Once enough pressure builds up in canister 14, valve element 30 of pressurization valve 28 is unseated and pushed into an open position such that air 45 passes through pressurization valve 28 and into first passage 32. Once air 45 enters into first passage 32, air 45 travels through first passage 32 and back to accessory gearbox 27.

Figure 3:
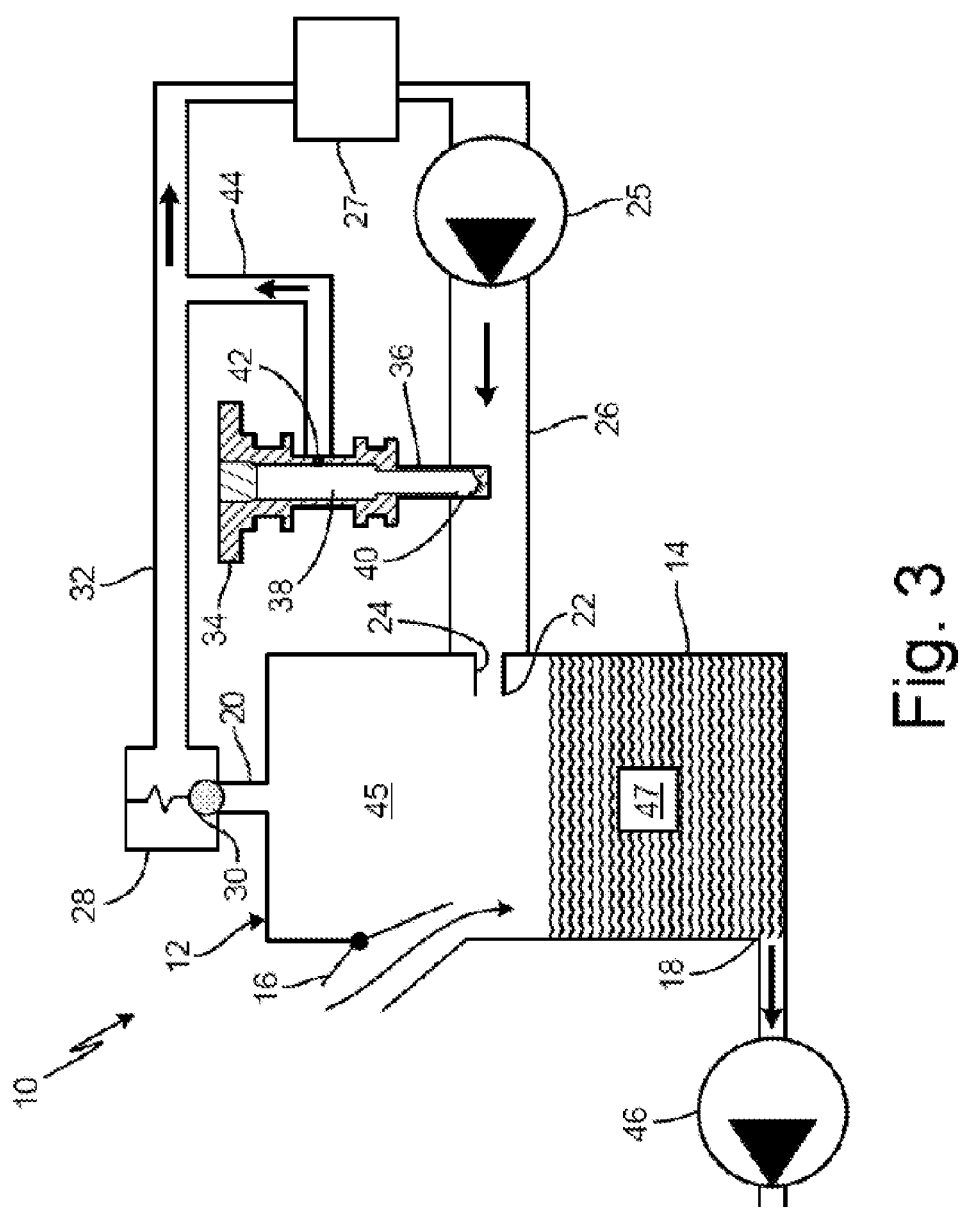
FIG. 3 is a schematic view of the reservoir assembly and shows the pressurization valve in a closed position, the vent valve, and a fill port in an open state.

FIG. 3 is a schematic view of the reservoir assembly 10 and shows tank 12 (with canister 14, fill port 16, first oil outlet 18, second air outlet 20, inlet 22, and restrictor 24), return passage 26, pressurization valve 28 (with valve element 30), first passage 32, vent valve 34 (with body 36, channel 38, inlet orifice 40, outlet orifice 42), bleed flow passage 44, pump 46, air 45, and oil 47. In this embodiment, pressurization valve 28 is shown in a closed position with valve element 30 in a seated position. Also in this example, fill port 16 is shown in an open position. Here, reservoir assembly 10 is shown during a shut-down and servicing phase. For example, fill port 16 is shown in an open position to allow for a user to access canister 12 for servicing (e.g., to introduce fresh oil 47).

In existing reservoir assemblies, without a feature such as vent valve 34, a large positive or negative pressure differential can remain in the reservoir tank upon engine shut-down. Such a scenario can cause difficulty and/or damage to the reservoir tank upon the user attempting to remove the fill port cap with a large pressure differential still present in the tank. In contrast, with vent valve 34 allowing for the depressurization of tank 12 upon shut-down, straight-forward and easy opening of fill port 16 is achieved due to there being little or no pressure differential across fill port 16.

Figure 4:
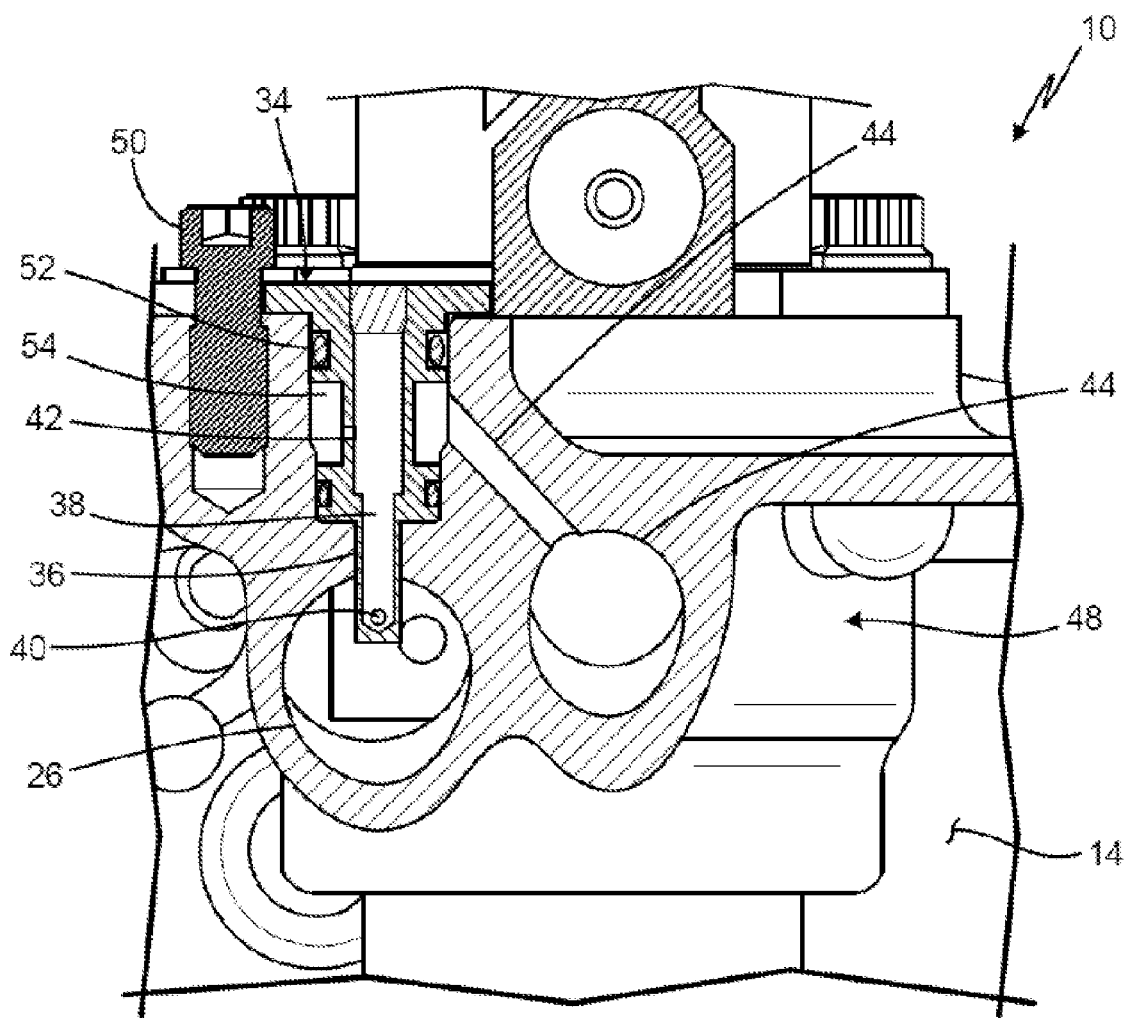
FIG. 4 is a cross-section view of a manifold with the vent valve.

FIG. 4 is a cross-section view of a portion of reservoir assembly 10 and shows canister 14 and manifold 48 shown in cross-section (with return passage 26, vent valve 34, body 36, channel 38, inlet orifice 40, outlet orifice 42, bleed flow passage 44, pin 50, O-rings 52, and annular opening 54).

Manifold 48 is a piece of solid material. In this example, manifold 48 can include a metallic material such as aluminum or steel. Pin 50 is a fastener. In this example, pin 50 can be a rivet, a bolt, or a press-fit pin. O-rings 52 are gaskets. Annular opening 54 is an annular shaped open area in manifold 48. Manifold 48 is attached or mounted to canister 14 of reservoir assembly 10. Pin 50 is inserted through a portion of vent valve 34 and into a receiving orifice of manifold 48. O-rings 52 are disposed in various portions of body 36 of vent valve 34. O-rings 52 are in sealing contact with body 36 and with manifold 48. Annular opening 54 is disposed in manifold 48 such that annular opening 54 encircles a portion of body 36 that outlet orifice 42 opens out of. Annular opening 54 fluidly connects outlet orifice 42 to bleed flow passage 40.

Manifold 48 provides a support structure for various elements of reservoir assembly 10. For example, bleed flow passage 40 and return passage 26 can be machined out of portions of manifold 48. Pin 50 attaches vent valve 34 to manifold 48. In other non-limiting embodiments, a single or multiple of pins 50 can be used to attach canister 14, vent valve 34, and manifold 48 to each other. O-rings 52 form a fluidic seal between body 36 of vent valve 34 and a portion of manifold 48 to prevent fluid flow out of manifold 48. Annular opening 54 provides a pocket into which bleed air is received from outlet orifice 42 and transferred to bleed flow passage 44.

Discussion of Possible Embodiments

An oil reservoir assembly includes a tank, a return passage, a pressurization valve, a first passage, and a vent valve. The tank includes a canister, a fill port, an first oil outlet, an second air outlet, and an inlet. The inlet is disposed in the canister and is connected to a restrictor. The return passage is connected to the inlet of the tank and to a scavenge pump. The pressurization valve is fluidly connected to the second air outlet of the tank. The first passage is connected to the pressurization valve and to an accessory gearbox of the engine. The vent valve is disposed in the return passage and includes a body, a channel extending through the body, an inlet orifice, and an outlet orifice. The inlet orifice is disposed in an end of the body. The outlet orifice is fluidly connected to the inlet orifice via the channel.

The assembly of the preceding paragraph can optionally include, additionally and/or alternatively, any one or more of the following features, configurations and/or additional components.

The outlet orifice can be connected to a bleed flow passage extending from the outlet orifice to a point along the first passage.

The valve member can comprise a spring loaded poppet valve.

The first oil outlet can be connected to a pump of the engine.

The restrictor can comprise a separator configured to separate oil from air.

When the valve member occupies an open position, the second air outlet of the tank can be in direct fluid communication with the accessory gearbox of the engine.

The restrictor can comprise a centrifugal separator.

A method of reducing the pressure in an oil reservoir tank of an aircraft includes turning off an engine of the aircraft. A valve element is seated inside of a pressurization valve that is disposed fluidly between a second air outlet of the oil reservoir tank and a first passage connected to an accessory gearbox of the engine. Air and oil are drawn out of the return passage into the oil reservoir tank. A portion of the air is drawn out of the oil reservoir tank through an inlet of the oil reservoir tank and into the return passage. Air is vented from the return passage into a bleed orifice in a vent valve. The bleed orifice is disposed in a shaft of the vent valve that extends into the return passage. The bleed orifice is connected to a channel extending through the shaft of the vent valve. Air is passed through the channel of the vent valve and into a bleed flow passage connected to the accessory gearbox of the engine.

The method of the preceding paragraph can optionally include, additionally and/or alternatively, any one or more of the following steps, features, configurations and/or additional components.

Oil can be removed from the oil reservoir tank through a first oil outlet of the oil reservoir tank.

A pressure of the oil reservoir tank can be reduced to an ambient pressure.

The portion of the air can be passed through a restrictor connected to the inlet of the oil reservoir tank.

The oil reservoir tank can be accessed, after the pressure of the oil reservoir tank has been brought to the ambient pressure, via a fill port of the oil reservoir tank.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An oil reservoir assembly for an engine of an aircraft, the oil reservoir assembly comprising:
    a tank comprising:
        a canister with an interior configured to contain a fluid;
        a fill port disposed in the canister;
        a first oil outlet mounted to a lower portion of the canister and in fluid communication with the interior of the canister;
        a second air outlet mounted to an upper portion of the canister and in fluid communication with the interior of the canister; and
        an inlet disposed in the canister, wherein the inlet is connected to a restrictor;
    a return passage disposed fluidly between the inlet of the tank and a scavenge pump of the engine, wherein the scavenge pump is fluidly connected to an accessory gearbox attached to the engine;
    a first passage disposed fluidly between the second air outlet and the accessory gearbox;
    a pressurization valve disposed fluidly between the first passage and the second air outlet of the tank, the pressurization valve with a valve member; and
    a vent valve disposed in the return passage, wherein the vent valve is disposed fluidly between the return passage and the first passage, the vent valve comprising:
        a body;
        a channel extending through a portion of the body;
        an inlet orifice disposed in a downstream end of the body relative to a direction of flow of air and oil through the return passage during engine operation; and
        an outlet orifice fluidly connected to the inlet orifice via the channel.

2. The oil reservoir assembly of claim 1, wherein the outlet orifice is connected to a bleed flow passage extending from the outlet orifice to a point along the first passage.

3. The oil reservoir assembly of claim 1, wherein the valve member comprises a spring loaded poppet valve.

4. The oil reservoir assembly of claim 1, wherein the first oil outlet is connected to a pump of the engine.

5. The oil reservoir assembly of claim 1, wherein the restrictor comprises a separator configured to separate oil from air.

6. The oil reservoir assembly of claim 1, wherein when the valve member occupies an open position, the second air outlet of the tank is in direct fluid communication with the accessory gearbox of the engine.

7. The oil reservoir assembly of claim 1, wherein the restrictor comprises a centrifugal separator.

8. A method of reducing the pressure in an oil reservoir tank of an aircraft (6), the method comprising:
    turning off an engine (8) of the aircraft, wherein the oil reservoir tank (12) is connected to the engine via a return passage;
    seating a valve element inside of a pressurization valve that is disposed fluidly between a second air outlet of the oil reservoir tank and a first passage connected to an accessory gearbox (27) of the engine;
    draining air and oil out of the return passage into the oil reservoir tank;
    drawing a portion of the air out of the oil reservoir tank through an inlet of the oil reservoir tank and into the return passage;
    venting air from the return passage into a bleed orifice (40) in a vent valve, wherein the bleed orifice is disposed in a shaft (36) of the vent valve that extends into the return passage, wherein the bleed orifice is connected to a channel extending through the shaft of the vent valve; and
    passing the air through the channel of the vent valve and into a bleed flow passage connected to the first passage.

9. The method of claim 8, further comprising removing oil from the oil reservoir tank through a first oil outlet of the oil reservoir tank.

10. The method of claim 8, further comprising reducing a pressure of the oil reservoir tank to an ambient pressure.

11. The method of claim 8, wherein drawing the portion of the air out of the oil reservoir tank and into the return passage further comprises passing the portion of the air through a restrictor connected to the inlet of the oil reservoir tank.

12. The method of claim 8, further comprising accessing the oil reservoir tank, after the pressure of the oil reservoir tank has been brought to the ambient pressure, via a fill port of the oil reservoir tank.

* * * * *